(12) United States Patent
Kane

(10) Patent No.: US 7,131,065 B1
(45) Date of Patent: Oct. 31, 2006

(54) DYNAMICALLY ALTERING WEB PAGE CONTENT BASED ON A PAGE'S TITLE PROPERTIES

(75) Inventor: Christopher R. Kane, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 718 days.

(21) Appl. No.: 09/608,897

(22) Filed: Jun. 30, 2000

(51) Int. Cl.
*G06F 15/00* (2006.01)

(52) U.S. Cl. .................. 715/517; 715/513; 715/520; 715/526; 715/788

(58) Field of Classification Search ............ 715/517, 715/522, 523, 513, 520, 526, 788
See application file for complete search history.

(56) References Cited

U.S. PATENT DOCUMENTS

| | | | |
|---|---|---|---|
| 5,860,073 A * | 1/1999 | Ferrel et al. | 715/522 |
| 5,878,421 A * | 3/1999 | Ferrel et al. | 707/100 |
| 5,907,704 A | 5/1999 | Gudmundson et al. | |
| 5,937,160 A | 8/1999 | Davis et al. | |
| 5,978,847 A | 11/1999 | Kisor et al. | |
| 5,983,170 A | 11/1999 | Goodman | |
| 5,995,975 A | 11/1999 | Malcolm | |
| 6,021,409 A * | 2/2000 | Burrows | 707/102 |
| 6,279,015 B1 * | 8/2001 | Fong et al. | 715/523 |
| 6,360,236 B1 * | 3/2002 | Khan et al. | 715/526 |
| 6,580,438 B1 * | 6/2003 | Ichimura et al. | 715/732 |
| 6,668,354 B1 * | 12/2003 | Chen et al. | 715/517 |

OTHER PUBLICATIONS

George Young, Cascading Style Sheets in IE4, Microsoft, Oct. 15, 1997, pp. 1-26.*
Lonnie E. Moseley, Office 97 Professional Edition, Microsoft, Second Edition, Copyright 1997, pp. 137-138.*
Michael Bostock, DHTML Buzzword Bingo, Published 1999, Netscape, pp. 1A-8A and 1B-9B.*
"Structured Document Management System", IBM Technical Disclosure Bulletin, vol. 40, No. 3, (Mar. 1997), pp. 261-262.

* cited by examiner

*Primary Examiner*—Heather R. Herndon
*Assistant Examiner*—Matthew Ludwig
(74) *Attorney, Agent, or Firm*—Scully, Scott, Murphy & Presser, P.C.; William E. Schiesser

(57) ABSTRACT

A method and system of dynamically altering the contents of a web page. The method comprises the steps of providing a web page having a title selected in accordance with a pre-defined naming convention, and providing a style sheet having pre-defined style attributes. The method further comprises the steps of selecting the web page, reading the title and identifying a section name based on the title, and altering the pre-defined style attributes based on the section name. This invention allows the Web page developer to highlight the active section of the site within the left-hand navigation (or anywhere on the page, if desired) using CSS and JAVA Script. No manual intervention is required. As new pages are added to the Web site, the developer simply follows the established naming convention, and the appropriate section will automatically be highlighted.

13 Claims, 6 Drawing Sheets

The HTML

Header
```
<HTML>
<HEAD>
<TITLE>PharmaCare * Members Services * Overview of Services</TITLE>
<LINK REL="StyleSheet" TYPE="text/css" HREF="/shared/css/site_style.css">
<SCRIPT LANGUAGE="javascript1.1" SRC="/shared/scripts/menu_highlight.js"></SCRIPT>
</HEAD>
```

Navigation
```
<A HREF="/members/index.html" ID="overviewofservices" CLASS="leftHandNav">Overview of Services</A>
    <BR><IMG SRC="/shared/images/spacer.gif" WIDTH=1 HEIGHT=7 BORDER=0 ALT=""><BR>
<A HREF="javascript: void(0)" ID="drugreference" CLASS="leftHandNav">Drug Reference</A>
    <BR><IMG SRC="/shared/images/spacer.gif" WIDTH=1 HEIGHT=7 BORDER=0 ALT=""><BR>
<A HREF="javascript: void(0)" ID="diseaseinformation" CLASS="leftHandNav">Disease Information</A>
    <BR><IMG SRC="/shared/images/spacer.gif" WIDTH=1 HEIGHT=7 BORDER=0 ALT=""><BR>
<A HREF="javascript: void(0)" ID="forms" CLASS="leftHandNav">Forms</A>
    <BR><IMG SRC="/shared/images/spacer.gif" WIDTH=1 HEIGHT=7 BORDER=0 ALT=""><BR>
<A HREF="/members/online_pharmacy_services.html" ID="onlinepharmacyservices" CLASS="leftHandNav">Onli
    <BR><IMG SRC="/shared/images/spacer.gif" WIDTH=1 HEIGHT=7 BORDER=0 ALT=""><BR>
<A HREF="/members/registration_form.html" ID="registration" CLASS="leftHandNav">Registration</A>
    <BR><IMG SRC="/shared/images/spacer.gif" WIDTH=1 HEIGHT=7 BORDER=0 ALT=""><BR>
<A HREF="javascript: void(0)" ID="qanda" CLASS="leftHandNav">Q & A</A><BR CLEAR="all">
```

The StyleSheet Declaration
```
/* ****************************************
 **           Lefthand Navigation Styles           **
 **************************************** */
A.leftHandNav:link, A.leftHandNav:active, A.leftHandNav:visited
    {color: #808080;
     font-size: 14px;
     line-height: 16px;
     text-decoration: none;
    }

A.leftHandThirdNav:link, A.leftHandThirdNav:active, A.leftHandThirdNav:visited
    {color: #808080;
     font-size: 12px;
     line-height: 14px;
     text-decoration: none;
    }
```

Fig. 2

The JavaScript Code

```
var docTitle = document.title;
var subSection = new String();
var temp = new String();

window.onerror = doNothing;

function doNothing () {
return true;
}

// pull section title from the page title
function getTitle () {
  subSection = docTitle.substring(docTitle.indexOf("*")+1);
  subSection = subSection.substring(subSection.indexOf("*")+1);

if (subSection.indexOf("*")!=-1) {
    subSection = subSection.substring(0, subSection.indexOf("*"));
  } for (var i=0; i < subSection.length; i++) {
    if (subSection.charAt(i) != " ") {
    temp = temp + subSection.charAt(i);
    }
  }
  subSection = temp;
  subSection = subSection.toLowerCase();
}

// highlight current 2nd level navigational element
function selectLeftNav() {
  getTitle();
  if (document.layers) {
    document.ids[subSection].color = "#005539";
    document.ids[subSection].fontweight = "700";
  } else {
      if (document.all) {
        document.all[subSection].style.color = "#005539";
        document.all[subSection].style.fontWeight = "500";
      }
    }
}
```

Fig. 3

The Results

The "Overview of Services" text within the title results in the highlighting of "Overview of Services" in the left-hand navigation.

DYNAMICALLY ALTERING WEB PAGE CONTENT BASED ON A PAGE'S TITLE PROPERTIES

BACKGROUND OF THE INVENTION

This invention generally relates to altering contents of Web pages; and, more specifically, the invention relates to methods and systems of altering automatically the properties of specific content within a Web page without manual intervention.

In recent years, a unique distributed database has emerged in the form of the World-Wide Web (Web). The database records of the Web are in the form of pages accessible via the Internet. On the Web, tens of millions of pages are accessible by anyone having a communications link to the Internet.

The pages of the Web are dispersed over millions of different computer systems all over the world. Users of the Internet constantly desire to locate specific pages containing information of interest. The pages can be expressed in a number of different character sets, including English, French, German, Spanish, Cyrillic, Kanakata and Mandarin. In addition, the pages can include specialized components, such as embedded forms, executable programs, JAVA applets and hypertext.

The pages of the Web can be constructed using various formatting conventions, for example, ASCII text, Postscript files, html files, and Acrobat files. The pages can include links to multimedia information content other than text, such as audio, graphics, and moving pictures. As a complexity, the Web can be characterized as an unpredictable random update, insert and delete database with a constantly changing morphology.

In order to increase the usability of a Web site, it is desirable to indicate in which section of the site the page the user is currently viewing is located by highlighting the section name within the left-hand navigation. Current processes for doing this require either the hard coding of the highlighted section into each individual Web page, or the creation of several server side includes for each variation. Either process requires manual editing of HTML and SSI files if new sections are added or section names are altered.

SUMMARY OF THE INVENTION

An object of this invention is to automatically alter the properties of specific content within a web page without manual intervention.

Another object of this invention is to increase the usability of Web sites.

A further object of the present invention is, when a user is viewing a page of a Web site, to highlight on the page the section of the Web site having that page.

These and other objectives are attained with a method and system of dynamically altering the contents of a web page. The method comprises the steps of providing a web page having a title selected in accordance with a pre-defined naming convention, and providing a style sheet having pre-defined style attributes. The method further comprises the steps of selecting the web page, reading the title and identifying a section name based on the title, and altering the pre-defined style attributes based on the section name.

This invention allows the Web page developer to highlight the active section of the site within the left-hand navigation (or anywhere on the page, if desired) using CSS and JAVA Script. No manual intervention is required. As new pages are added to the Web site, the developer simply follows the established naming convention, and the appropriate section will automatically be highlighted.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 2 shows several routines that may be used in the practice of this invention.

FIG. 3 shows script code that may be used in the implementation of this invention.

DETAILED DESCRIPTION OF THE PREFERRED EMBODIMENTS

Figure 1:
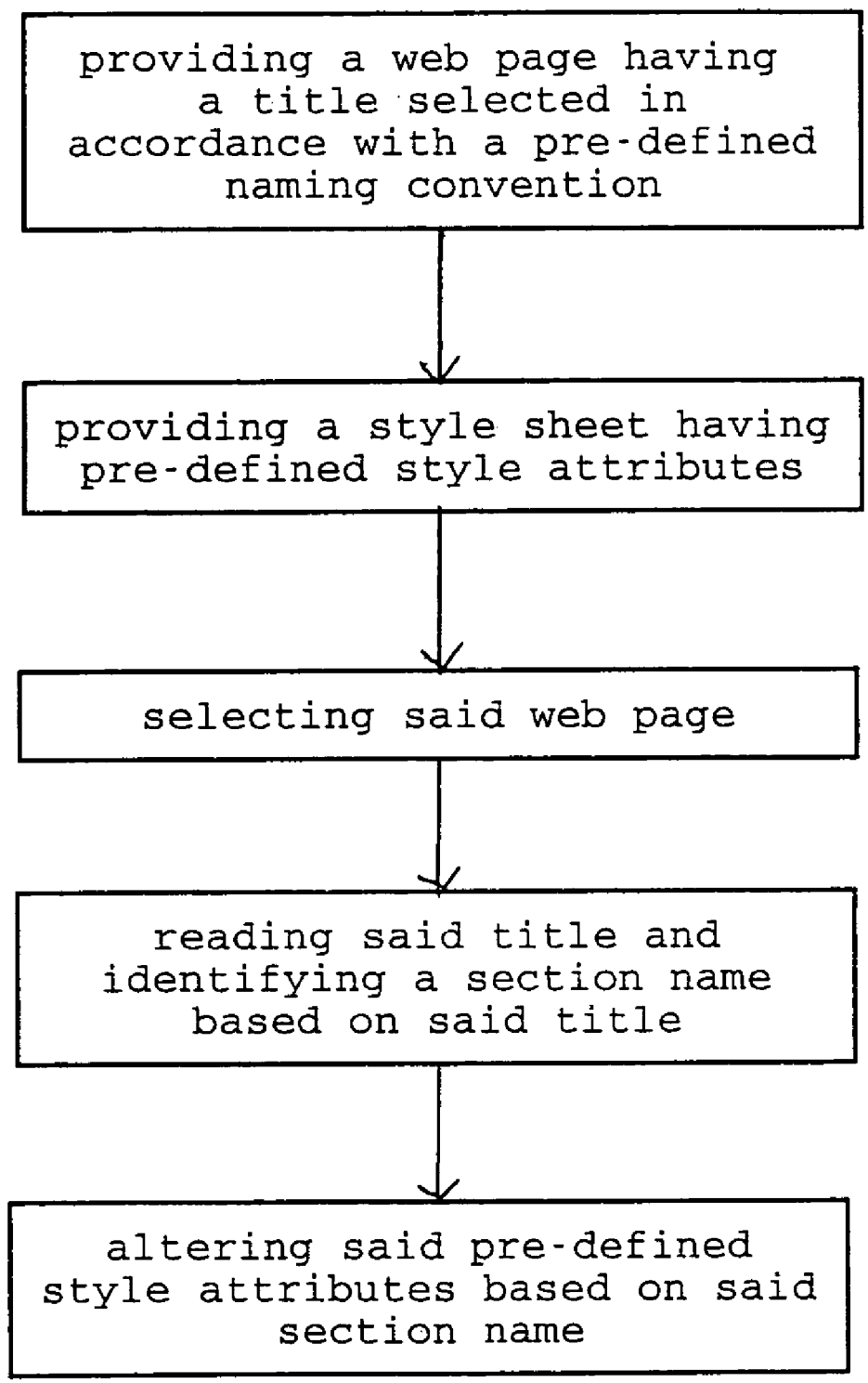
FIG. 1 is a flow chart outlining the method of this invention.

The present invention relates to a method and system of dynamically altering the contents of a web page. With reference to FIG. 1, the method generally comprises the steps of providing a web page having a title selected in accordance with a pre-defined naming convention, and providing a style sheet having pre-defined style attributes. The method further comprises the steps of selecting the web page, reading the title and identifying a section name based on the title, and altering the pre-defined style attributes based on the section name.

As an example, the naming convention used for the title of the Web pages may be set up to establish the "Title of the Web Site," "User Group," "Section Name," and "Page Name." Each element of the title tag may be delimited by an asterisk. (The title of the page may be set by the developer when the page is first created.) The HTML then calls and applies a Style Sheet and JavaScript file to the Web page.

A style sheet, it may be noted, is a collection of formatting information, such as fonts and tabs in a textual document, that can be manipulated and applied as a single unit. Typically, style sheets are associated with particular documents; however, style sheets may also be applied to individual display regions on pages within titles.

With reference to FIG. 2, each link within the Navigational HTML has been uniquely identified with an ID and assigned a Class name to apply style attributes to the linked test. The ID naming convention uses the same name as the Section Name found within the title. However all characters have been set to lowercase and blank spaces have been removed from the ID.

With reference to FIG. 3, next the JavaScript is executed and reads in the value of the HTML page title. It then parses the value received from the title until the Section Name is identified. Blank spaces are then eliminated from the Section Name and the characters are set to lowercase. The script now has the name of the corresponding ID for active link found within the Navigational HTML. The JavaScript then identifies certain properties of the users Web browser and dynamically alters the style attributes for the corresponding ID accordingly.

Figure 4:
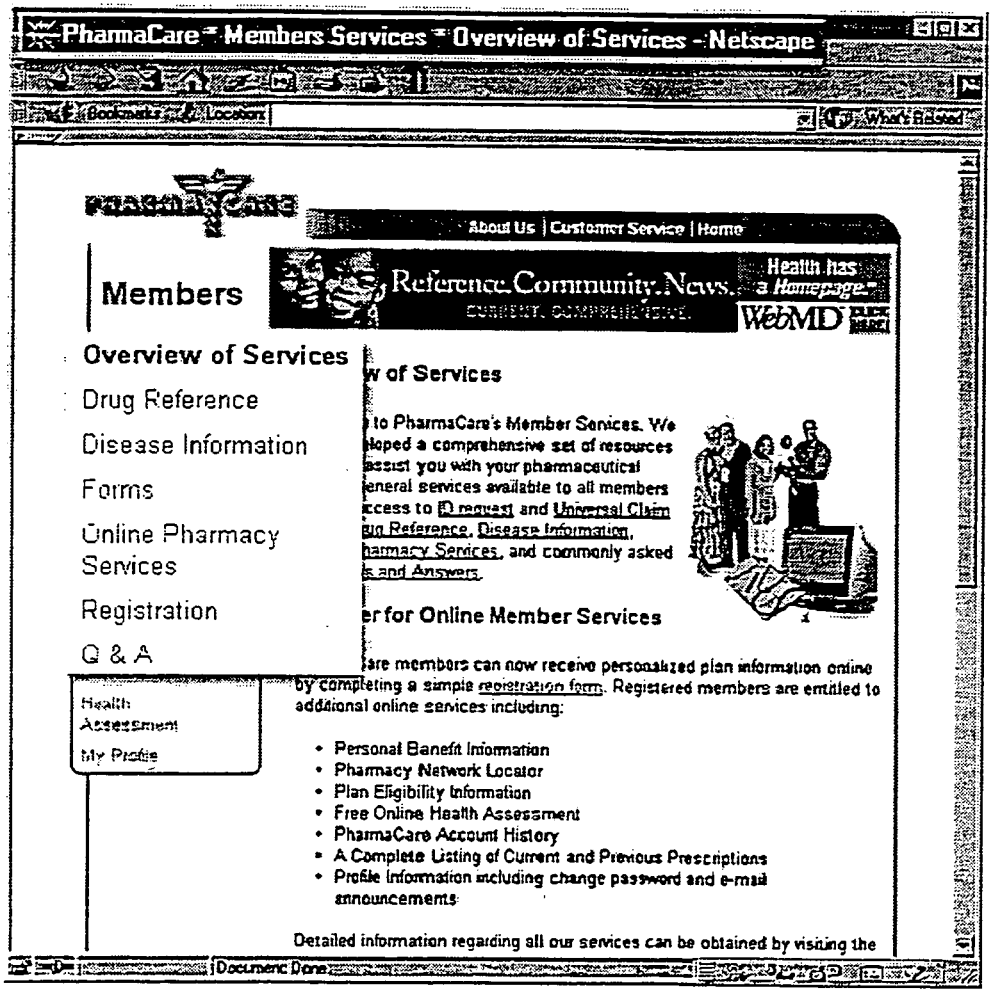
FIG. 4 shows a Web page illustrating the results of the present invention.

FIG. 4 shows a Web page developed using the present invention. On this page, the "Overview of Services" text within the title results in the highlighting of "Overview of Services" in the left-hand navigation.

An important advantage of this process, as opposed to other processes, is the developer can create an infinite number of pages below each section of the Web site and the proper section for those pages will be highlighted dynamically in the left-hand navigation. As long as the proper naming convention is used for the navigation's link IDs and the HTML page title, no developer intervention is required. The preferred embodiment of the invention allows the developer to implement a single JavaScript file that does not contain hard-coded variables. As long as the naming convention established within the script is used for the Web page Title and the link Ids when the page is initially created, no manual intervention is required by the developer. The present invention is more compact (since no variables are hard-coded), can be used globally throughout all sections of the Web site, and requires no additional maintenance once the script is implemented.

Figure 5:
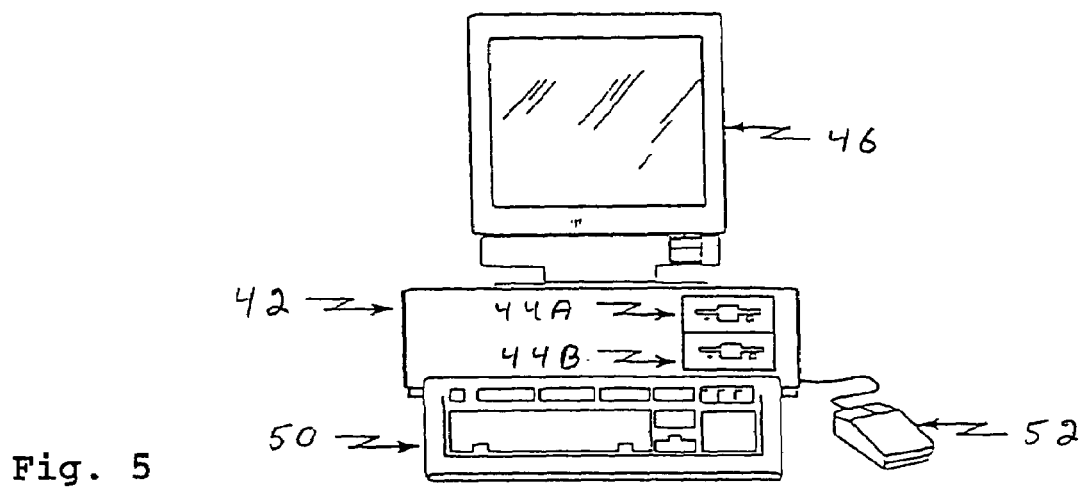
FIGS. 5 and 6 show a computer system that may be used in the invention.

As will be understood by those of ordinary skill in the art, the present invention may be carried out on any suitable computer or computer network. FIG. 5 illustrates, as an example, a computer of a type that may be used in the practice of this invention. Viewed externally in FIG. 5, a computer system has a central processing unit 42 having disk drives 44A and 44B. Disk drive indications 44A and 44B are merely symbolic of a number of disk drives that might be accommodated by the computer system. Typically, these would include a floppy disk drive such as 44A, a hard disk drive (not shown externally) and a CD ROM drive indicated by slot 44B. The number and type of drives vary, usually, with different computer configurations. The computer has the display 46 upon which information is displayed. A keyboard 50 and a mouse 52 are normally also available as input devices.

Figure 6:
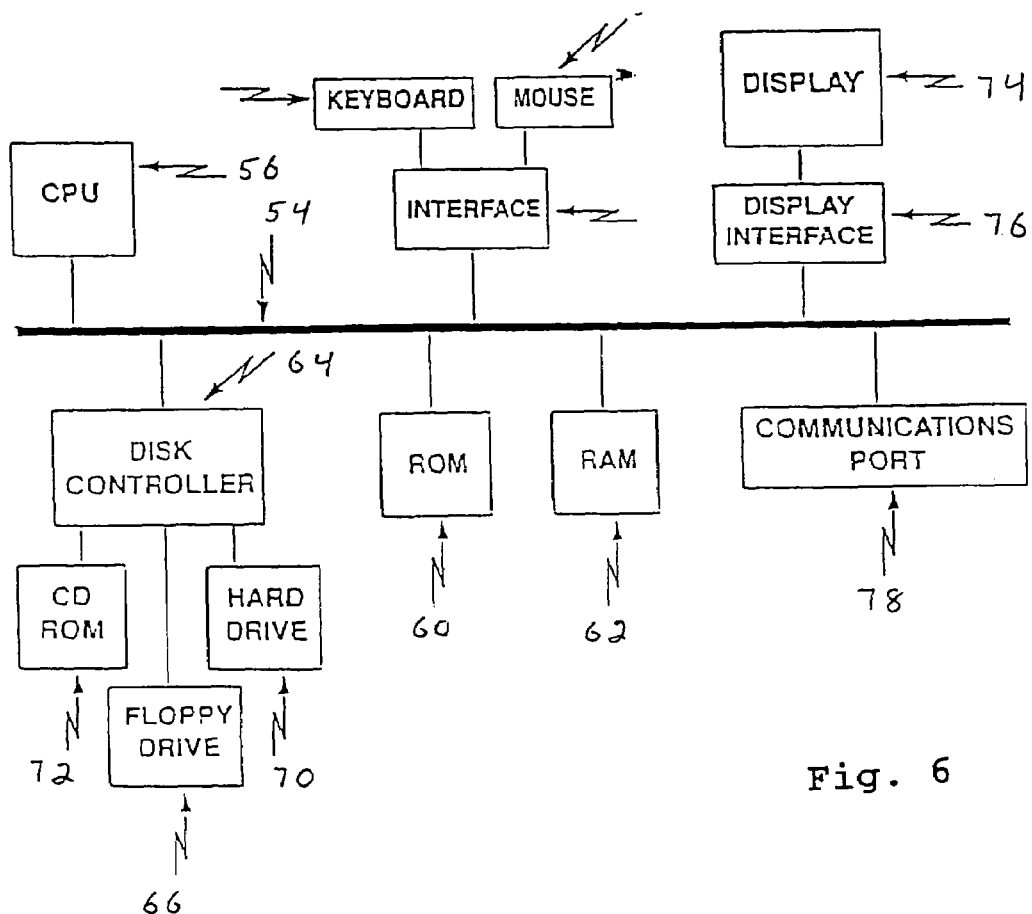

FIG. 6 shows a block diagram of the internal hardware of the computer of FIG. 5. A bus 54 serves as the main information highway, interconnecting the other components of the computer. CPU 56 is the central processing unit of the system, performing calculations and logic operations required to execute programs. Read only memory 60 and random access memory 62 constitute the main memory of the computer. Disk controller 64 interfaces one or more disk drives to the system bus 54. These disk drives may be floppy disk drives, such as 66, internal or external hard drives, such as 70, or CD ROM or DVD (Digital Video Disks) drives, such as 72. A display interface 74 interfaces a display 76 and permits information from the bus to be viewed on the display. Communications with external devices can occur over communications port 78.

Figure 7:
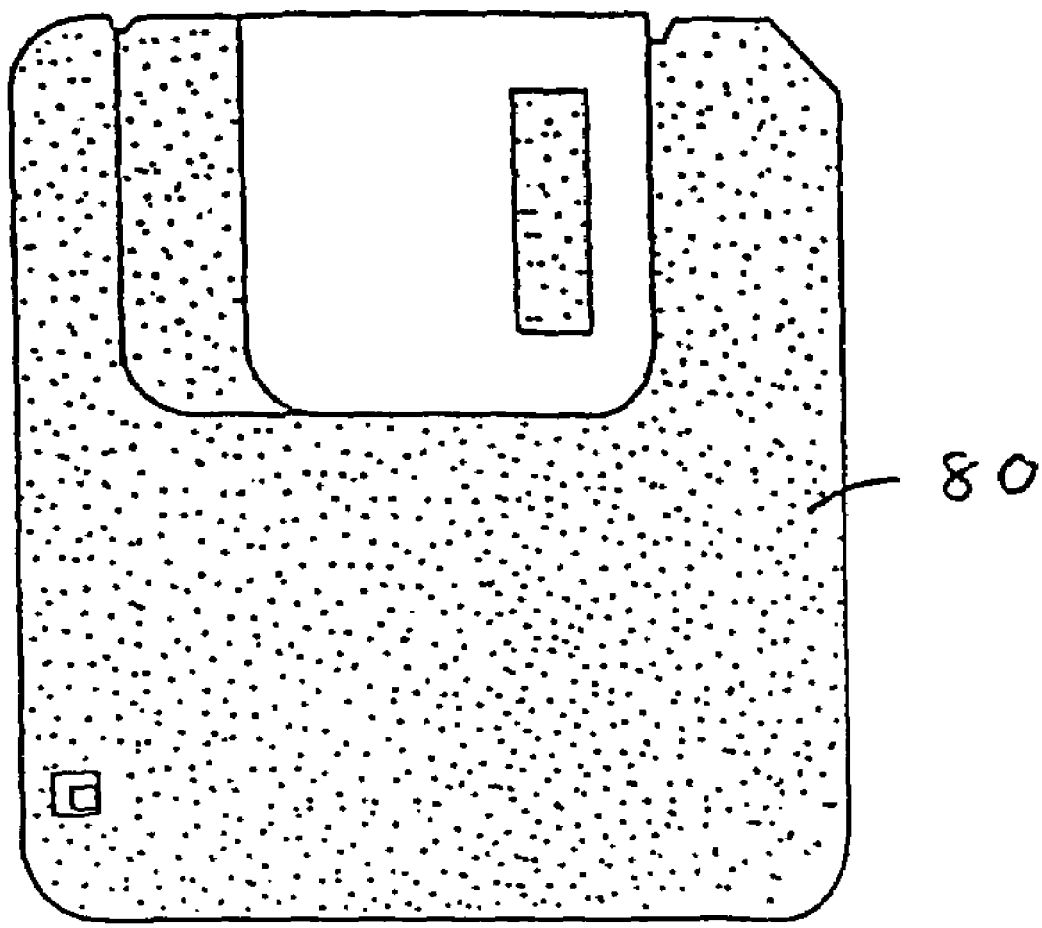
FIG. 7 illustrates a memory medium that can be used to hold a computer program for carrying out this invention.

FIG. 7 shows a memory medium 80 that may be used to hold a computer program for implementing the present invention, and this medium may be used in any suitable way with any appropriate computer to carry out the invention. Typically, memory media such as a floppy disk, or a CD ROM, or a Digital Video Disk will contain the program information for controlling the computer to enable the computer to perform its functions in accordance with the invention.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of dynamically altering the contents of a web page of a web site, said web site including a multitude of web pages separated into a plurality of sections of the web site, each of said sections having a section name, the method comprising the steps of:

adding a web page to a web site, the added web page having pre-defined style attributes;

giving the added web page a title selected in accordance with a pre-defined naming convention;

providing a style sheet having pre-defined style attributes;

selecting said added web page; and providing a computer program that, in response to the step of selecting said added web page, automatically performs the steps of (i) reading said title, (ii) identifying a section of the web site based on said title, and (iii) using the pre-defined style attributes of the style sheet to alter said pre-defined style attributes of the added web page based on said section name and to show the section name on the added web page in a predetermined manner established by the style attributes of the style sheet, including the steps of:

using the read title of the added web page to call the style sheet; and applying a file of the style sheet to the web page.

2. A method according to claim 1, wherein the reading step includes the steps of:

reading in the value of the page title; and parsing said value until the section name is identified.

3. A method according to claim 1, wherein:

the web page has a region for linked text;

one of the pre-defined style attributes is given text; and the altering step includes the step of adding the given text to the region for linked text when the section name is identified.

4. A method according to claim 1, wherein the altering step includes the further step of altering said pre-defined style attributes of the web page based on said section name to show the section name in a pre-given location on the web page, said location being determined by the style attributes of the style sheet.

5. A method according to claim 1, wherein the step of using the read title of the web page to call the style sheet includes the steps of:

providing a navigation routine having a link to the style sheet;

using the read title of the web page to find said link; and using the found link to access the style sheet.

6. A system for dynamically altering the contents of a web page of a web site, said web site including a multitude of web pages separated into a plurality of sections of the web site, each of said sections having a section name, the system comprising:

means for adding a web page to a web site, the added web page having pre-defined style attributes;

means for giving the added web page a title selected in accordance with a pre-defined naming convention;

means for providing a style sheet having pre-defined style attributes; and a computer program including i) means for selecting said added web page, ii) means for reading said title and identifying a section name of the web site based on said title, and iii) means for using the pre-defined style attributes of the style sheet to alter said pre-defined style attributes of the added web page on said section name and to show the section name on the added web page in a predetermined manner established by the style attributes of the style sheet, and wherein said selecting, reading and altering are done automatically in response to said added web page being selected; and wherein the means for using the pre-defined style attributes of the style sheet to alter said pre-defined style attributes of the added web page includes:
   means for using the read title of the added web page to call the style sheet; and
   means for applying a file of the style sheet to the added web page.

7. A system according to claim 6, wherein the reading means includes:
   means for reading in the value of the page title; and
   means for parsing said value until the section name is identified.

8. A system according to claim 6, wherein:
   the web page has a region for linked text;
   one of the pre-defined style attributes is given text; and
   the means for using the pre-defined style attributes of the style sheet to alter said pre-defined attributes of the web page includes means for adding the given text to the region for linked text when the section name is identified.

9. A program storage device readable by machine, tangibly embodying a program of instructions executable by the machine to perform method steps for dynamically altering the contents of a web page of a web site, said web site including a multitude of web pages separated into a plurality of sections of the web site, each of said sections having a section name, the method steps comprising:
   adding a web page to a web site, the added web page having a pre-defined style attributes;
   giving the added web page a title selected in accordance with a pre-defined naming convention;
   providing a style sheet having pre-defined style attributes;
   selecting said added web page; and
   in response to the step of selecting said added web page, automatically performing the steps of:
      i) reading said title,
      ii) identifying a section name of the web site based on said title, and
      iii) using the pre-defined style attributes of the style sheet to alter said pre-defined style attributes of the added web page based on said section name and to show the section name on the added web page in a predetermined manner established by the style attributes of the style sheet, wherein the step of using the pre-defined style attributes of the style sheet to alter said pre-defined style attributes of the added web page includes the steps of:
         using the read title of the added web page to call the style sheet; and
         applying a file of the style sheet to the added web page.

10. A program storage device according to claim 9, wherein the reading step includes the steps of:
    reading in the value of the page title; and
    parsing said value until the section name is identified.

11. A program storage device according to claim 9, wherein:
    the web page has a region for linked text;
    one of the pre-defined style attributes is given text; and
    the altering step includes the step of adding the given text to the region for linked text when the section name is identified.

12. A method of dynamically altering the contents of a web page of a web site, said web site including a multitude of web pages separated into a plurality of sections of the web site, each of said sections having a section name, the method comprising the steps of:
    adding a web page to a web site, the added web page having pre-defined style attributes;
    giving the added web page a title selected in accordance with a pre-defined naming convention;
    providing a style sheet having pre-defined style attributes;
    selecting said added web page; and
    providing a computer program that, in response to the step of selecting said added web page, automatically performs the steps of:
       (i) reading said title,
       (ii) identifying a section name of the web site based on said title, and
       (iii) using the pre-defined style attributes of the style sheet to alter said pre-defined style attributes of the added web page based on said section name and to show the section name on the added web page in a predetermined meaner established by the style attributes of the style sheet;
    wherein the reading step includes the steps of:
       reading in the value of the page title; and
       parsing said value until the section name is identified; and
    wherein the step of using the pre-defined style attributes of the style sheet to alter said pre-defined style attributes of the added web page includes the step of using the identified section name to indicate automatically on the added web page said identified section name.

13. A method of dynamically altering the contents of a web page of a web site, said web site including a multitude of web pages separated into a plurality of sections of the web site, each of said sections having a section name, the method comprising the steps of:
    adding a web page to the web site, the added web page having pre-defined style attributes;
    giving the added web page a title selected in accordance with a pre-defined naming convention;
    providing a style sheet having pre-defined style attributes;
    selecting said added web page; and
    providing a computer program that, in response to the step of selecting said added web page, automatically performs the steps of:
       (i) reading said title,
       (ii) identifying a section name of the web site based on said title, and
    using the read title of the added web page to call said style sheet;
       (iii) using the pre-defined style attributes of the style sheet to alter said pre-defined style attributes of the added web page based on said section name and to show the section name of the added web page in a predetermined manner established by the style attributes of the style sheet;
    wherein the reading step includes the steps of:
       reading in the value of the page title; and
       parsing said value until the section name is identified.

* * * * *